United States Patent [19]

Cloutier

[11] 4,366,052
[45] Dec. 28, 1982

[54] CONTROLLED FLOODING AND SKIMMING APPARATUS FOR BEACH CLEANING

[76] Inventor: Charles C. Cloutier, P.O. Box 885, Morgan City, La. 70380

[21] Appl. No.: 272,433

[22] Filed: Jun. 10, 1981

Related U.S. Application Data

[62] Division of Ser. No. 166,666, Jul. 7, 1980, Pat. No. 4,302,339.

[51] Int. Cl.³ .......................................... B01D 21/00
[52] U.S. Cl. .................................... 210/199; 210/241; 210/251; 210/923
[58] Field of Search ............................. 134/25.1–25.5; 209/421, 255, 250; 405/52, 263; 299/7; 210/923, 776, 924, 703, 270, 271, 273, 199, 241, 251

[56] References Cited

U.S. PATENT DOCUMENTS

| | | | |
|---|---|---|---|
| 1,748,898 | 12/1931 | Peebles | 210/270 |
| 2,311,594 | 2/1943 | Lose, Jr. | 210/271 |
| 2,762,616 | 9/1956 | Goggins | 299/7 |
| 2,884,742 | 5/1959 | Moore et al. | 299/7 |
| 3,503,774 | 3/1970 | Weymouth et al. | 405/52 |
| 3,510,168 | 5/1970 | Camp | 299/5 |
| 3,510,169 | 5/1970 | Moss et al. | 299/7 |
| 3,613,891 | 10/1971 | Cloutier | 210/242 S |
| 3,732,983 | 5/1973 | Volokh | 210/273 |
| 4,153,555 | 5/1979 | Acker | 210/198 R |
| 4,167,292 | 9/1979 | Eller | 299/7 |
| 4,212,353 | 7/1980 | Hall | 299/7 |

Primary Examiner—Robert H. Spitzer
Attorney, Agent, or Firm—Jones, Tullar & Cooper

[57] ABSTRACT

Apparatus for separating oil and other floatatable debris from the sand on a beach by localized flooding of the beach is disclosed. Suitable large diameter conduits are provided to introduce large quantities of water to a selected area of the beach, the water mixing with the sand and causing oil and other debris on or buried in the sand to float, and thus to rise toward the surface of the sand. A second flooding operation refloats the debris and a skimmer mechanism then removes the floating oil and other material while allowing the water to return to the beach area. The water supply is provided by means of suitable conduits carried by a truck, tractor, or other beach vehicle. In the preferred embodiment, the water required for flooding is obtained from the ocean by an extension of the supply conduits, with the forward motion of the tractor providing the required water flow through the conduits to the area to be cleaned. Alternatively, the desired water flow can be obtained by means of a low lift pump in the conduits, the pumps being hydraulically operated from the beach vehicle. The first flooding operation provides water to move the oil and other debris toward a center line, while the second provides water to refloat the material in the vicinity of the intake for the skimmer.

13 Claims, 2 Drawing Figures

CONTROLLED FLOODING AND SKIMMING APPARATUS FOR BEACH CLEANING

This is a division of application Ser. No. 166,666, filed July 7, 1980, now U.S. Pat. No. 4,302,339.

BACKGROUND OF THE INVENTION

The present invention relates, in general, to apparatus for cleaning sand beaches, and more particularly to apparatus for floating oil and other debris which has collected on an ocean beach and for collecting that material for disposal.

In part because of an increased awareness of environmental problems, and in part because of an increasing number of accidents involving the spillage of huge quantities of crude oil, the serious damage to shoreline ecology and the widespread destruction of recreation areas and wildlife habitat by such oil spillage has become of increasing concern throughout the world. Oil spills from accidents involving tankers or from runaway offshore oil wells seriously pollute beach areas throughout widespread areas, and the removal of the thick, tar-like residue from spills is an almost impossible task. No effective means for cleaning this material from beaches is available other than by complete removal of the surface layer of the beach and replacement with clean sand. While this may appear to solve the immediate problem of the affected beach, disposal of the oil-polluted sand remains an unsolved problem. Furthermore, removal of the top layer of sand and oil does not always completely clean the beach, for often the oil and other debris is washed on shore during a storm so that much of it is buried. This buried material later rises to the surface of the sand to present a continuing problem. In addition to being an ineffective remedy, the removal of the top layer of sand is extremely damaging to the shoreline ecological system, for removal of the sand results in elimination of the microorganisms in the sand that are essential to shore life. Thus, in the long run the removal of the sand may do more damage than the oil, and for this reason the sand removal method is no longer acceptable.

SUMMARY OF THE INVENTION

The present invention is directed to apparatus for simply and effectively removing oil residues and other floatatable debris from a beach rapidly, and with minimum expense, with a minimum amount of equipment, and without damaging the ecological system along the water's edge. The essential concept of the invention is the production of intense flooding at a localized area of a beach so as to cause the oil residues and other floatatable material to rise to the surface and to become separated from the sand. By thus suspending the material in water, it can easily be picked up by means of a skimmer of the type illustrated in U.S. Pat. No. 3,613,891 issued Oct. 19, 1971 to Charles C. Cloutier. This skimmer functions to pick up the top layer of material and separate it from the water and any sand or other fine particles that may also be carried by the water, with the bulkier tar deposits and similar materials being conveyed, after such separation, to a suitable container for subsequent disposal. The water and any entrained sand particles are returned to the beach by the skimmer without damage to or loss of microscopic organisms, so that the ecology of the shoreline remains intact. The localized flooding thus removes the oil and other debris from the sand in much the same way that the rising and falling tides and the accompanying wave action acts to lift and move the debris from one place to another, so that this material is removed in nature's own way, with minimal impact on the shoreline, and with no damage to the environment.

Floatation of the material to be removed from the beach can be accomplished, in accordance with the invention, by suitable supply conduits or pipes which direct large quantities of water at a relatively low velocity onto a defined localized area of the beach; for example, an area immediately in front of the skimmer device. The water may be conveniently obtained from the nearby ocean, bay, river, or the like, and is pumped to the desired location by suitable hydraulically driven pumps or by the motion of the intake end of the pipe through the water. The entire mechanism is mounted on a tractor or other beach going vehicle which may then be driven along the beach to accomplish the desired cleaning operation.

BRIEF DESCRIPTION OF THE DRAWINGS

The foregoing and additional objects, features and advantages of the invention will become apparent from a consideration of the following detailed description of a preferred embodiment thereof taken in conjunction with the accompanying drawings, in which.

DESCRIPTION OF A PREFERRED EMBODIMENT

Figure 1:
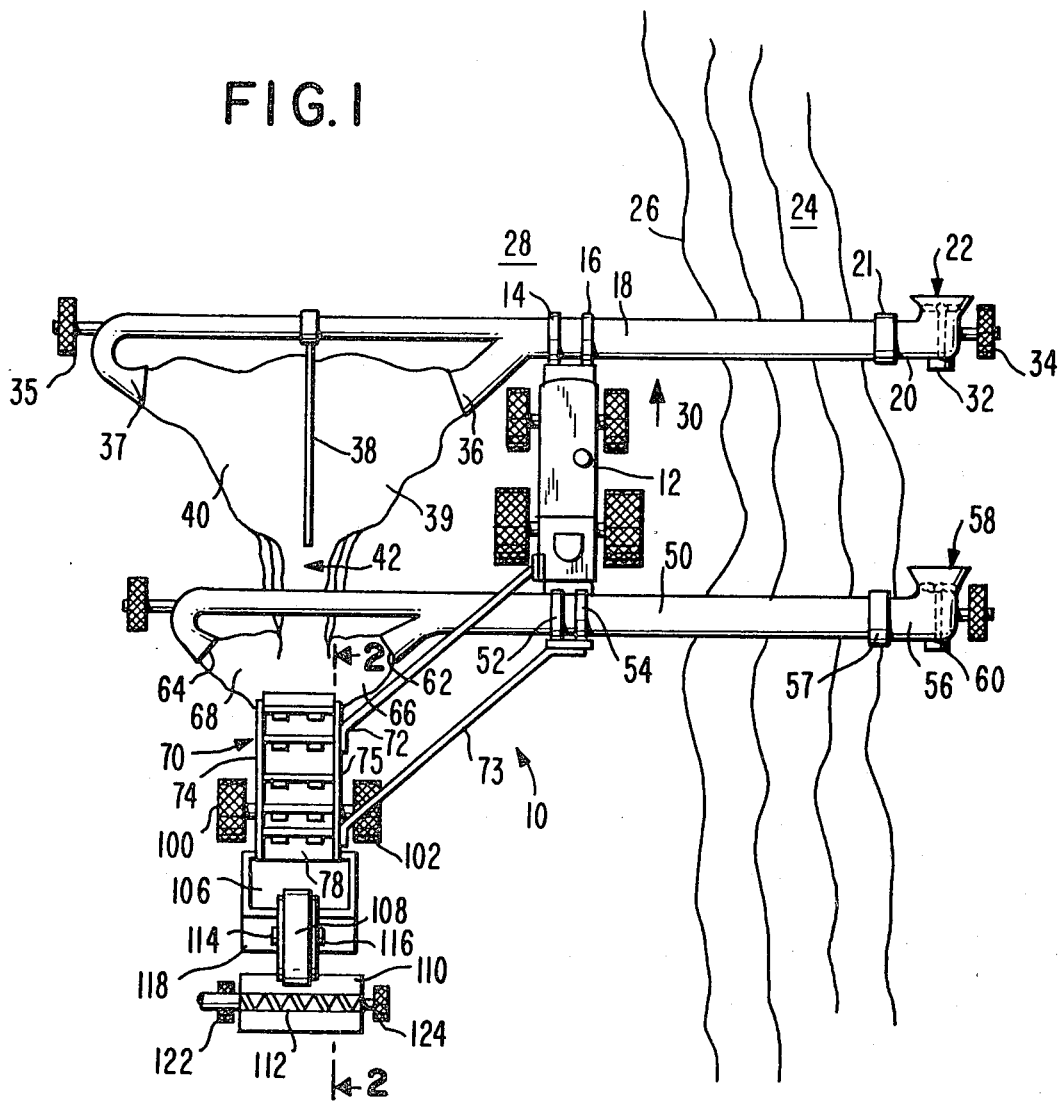
FIG. 1 is a diagrammatic plan view of equipment suitable for carrying out the present invention.

Referring now to the drawings, there is illustrated in FIG. 1 beach cleaning equipment generally indicated at 10 constructed in accordance with the present invention. The equipment includes a tractor 12 or other similar vehicle adapted to travel on sand beaches, a suitable vehicle being any conventional farm-type tractor. Secured to the front of the tractor, as by suitable brackets 14 and 16, is a transfer conduit or pipeline 18 which is adapted to extend laterally to both sides of tractor 12. The conduit 18 has a curved end 20 portion which is adjustably connected to the conduit by a coupling 21 so that its inlet 22 can be turned toward the direction of forward movement of the tractor. Conduit 18 extends sufficiently far to one side of the tractor (to the right side as viewed in FIG. 1) to position the inlet 22 in the body of water 24 when the tractor is driven along the water line 26 on beach area 28. The location of the inlet 22 can be adjusted so that when the tractor moves in the forward direction, indicated by arrow 30, water is forced into conduit 18. If desired, an auxiliary pump 32 may be provided to increase or regulate the flow of water. In addition, suitable support wheels 34 and 35 or the like may be mounted on opposite ends of conduit 18 to facilitate its motion through the water and along the beach.

The opposite end of the water collecting conduit 18 extends to the other side of tractor 12 (to the left as viewed in FIG. 1), and in the preferred form includes a pair of spaced outlets 36 and 37. As illustrated, outlet 36 is located relatively near the tractor 12 while outlet 37 is spaced away from the tractor, with the distance between the two outlets effectively defining the area of the beach which is to be cleaned. The two outlets are so arranged as to be angled generally toward each other and slightly rearwardly of the direction of motion of the tractor, with the outlets being relatively large with respect to the diameter of conduit 18 so that the water flow therefrom is at a relatively low velocity, but at a high volume. As illustrated, the portion of the conduit leading to outlet 37 preferably is of a reduced diameter so that the flow from outlet 37 is approximately equal to that from outlet 36.

In the preferred form of the invention, a divider wall 38 is supported by the conduit 18 at a point intermediate the outlets 36 and 37 to separate the flow from each. Accordingly, the outflow from outlet 36 will flood an area of the beach generally defined by the outline 39, while the outflow from outlet 37 will flood an area of the beach generally indicated by outline 40.

The high volume of water flowing from the outlets mixes with the top layer of the sand of the beach to produce a gently flowing pool of water. This pool provides a gentle lifting and floating of any buoyant materials on or in the sand on beach 28 within the areas being flooded. The water may flow at a sufficient rate to cause some sand particles and other materials to be lifted as well, and to be mixed in with the debris that is to be removed, but the flow rate and volume is controlled so as to cause the oil residues in the sand to be lifted to the surface and moved toward the center of the flooded area, along both sides of wall 38, while keeping to a minimum the amount of sand suspended in the water.

As the tractor moves forward, the flow of water from the outlets 36 and 37 lifts and moves the oil residues toward the center of the flooded area where it settles again on the surface of the beach as the water sinks down through the sand. It should be understood that this operation is not a high-pressure washing of the sand, but is a gentle suspension of the oil residue and a redeposit of the material in a more localized row, generally indicated at 42, along the path of wall 38 as the tractor moves forward.

Mounted to the rear of tractor 12, or to a suitable trailer (not shown) towed by the tractor, is a second water collecting conduit, or pipeline 50 secured to the tractor by means of suitable mounting brackets 52 and 54. Although it is preferred to mount conduit 50 on the rear of the same tractor which carries conduit 18, it will be apparent that in some circumstances it may be desired to mount this conduit on a trailer towed by tractor 12 in order to provide the desired spacing between conduits 18 and 50. Another alternative is to mount conduit 50 on a second tractor which may then independently follow tractor 12 at its own speed.

Conduit 50 is similar to conduit 18 in that it includes a curved end 56 which is adjustably mounted on the conduit by means of coupling 57. The curved end portion extends into the body of water 24 and is provided with an inlet 58, whereby when motion of the tractor causes the conduit to move forward, water is forced into the inlet and flows through the conduit for use in flooding a localized area of the beach. Again, if desired, a suitable pump 60 may be provided in conduit 50 to provide control and regulation of the water flow. This pump, as well as pump 32 on conduit 18, may be powered by the tractor 12, for example, by way of its hydraulic system through suitable hydraulic lines (not shown).

The outlet end of conduit 50 extends to the opposite side of tractor 12 and terminates in a pair of spaced outlets 62 and 64. Again, the outlets are angled toward each other and rearwardly of the direction of the motion of the tractor to produce a flood of water in the areas of the beach generally defined by outlines 66 and 68. The water flowing into these areas is of sufficient volume and at a sufficient rate to refloat the debris 42 previously deposited on the surface of the beach by the flow from conduit 18. Preferably, the flow from conduit 50 provides a sufficient flow to create a water depth of from one to two inches on the surface of the sand. This requires a substantial flow of water because of the porosity of the sand, and this high volume flow in effect creates, in a limited area of the beach, a suspension of sand and other materials in which the floatatable materials can rise to the surface for removal.

To pick up the material suspended by the water flow from conduit 50, a skimmer/separator unit generally indicated at 70 is provided. This skimmer unit preferably is secured to the tractor 12 and is moved along the beach by the tractor. For this purpose, unit 70 may be fastened to the tractor by means of a suitable towing hitch such as that diagrammatically illustrated at 72 and 73, or may be separately powered and its operation controlled from the tractor. The towing hitch serves to transport the skimmer unit 70 along a path spaced to one side of and parallel to the path followed by tractor 12, the hitch being designed in known manner to carry the skimmer unit along the desired path at the desired attitude. As shown, unit 70 is located midway between the outlets 62 and 64, and in line with the divider wall 38, so that it is in line with the row of debris 42 left by the flotation operation of the first flooding unit.

Figure 2:
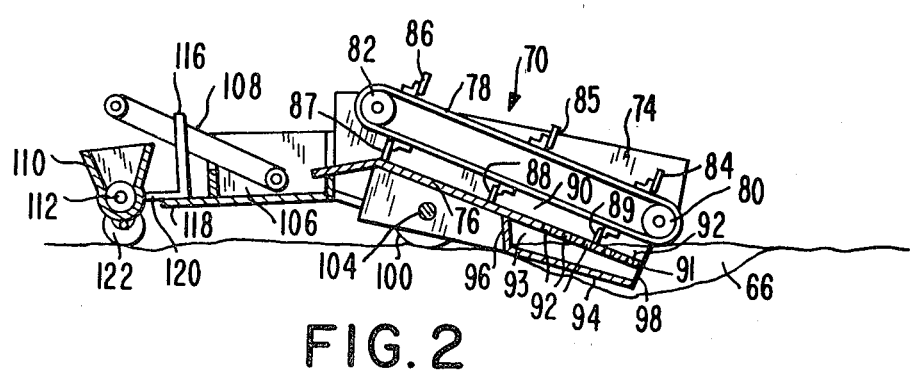
FIG. 2 is a sectional view taken along line 2—2 of FIG. 1 and showing the skimmer used with the present invention.

As illustrated in FIG. 2, and as described in greater detail in the aforesaid U.S. Pat. No. 3,613,891, the skimmer/separator 70 consists of a housing which includes side walls 74 and 75 and a sloping bottom plate 76 which are assembled to form a pickup channel for receiving the debris to be removed from the beach. Mounted within the channel is a conveyor mechanism comprising a belt 78 mounted for rotation about a pair of spaced rollers 80 and 82, one of which is driven to rotate the belt. Mounted on the belt at spaced locations are a plurality of collector paddles 84 to 89, each paddle being mounted on the belt by suitable brackets. These brackets provide a firm base for each paddle, with the paddles themselves being somewhat flexible to permit contact with the side walls 74 and 75 and the bottom channel 76.

It will be understood that in an alternative form of the skimmer, the belt 78 may be replaced by a pair of spaced drive chains mounted on sprockets, with the paddles and their mounting brackets being carried by the chains and extending across the full width of the channel, as more particularly described in U.S. Pat. No. 3,613,891.

The rollers 80 and 82 are mounted on suitable shafts extending between and journaled in the side walls 74 and 75, the shafts being so located as to lie in a plane substantially parallel to the bottom plate 76, whereby each paddle in turn will move along the length of the bottom plate, and in contact therewith, as the belt is located. Adjacent paddles thus cooperate with the bottom plate to form pockets, or chambers, such as that illustrated at 90 between the paddles 88 and 89, in which debris skimmed from the surface of the water will be entrapped and removed.

The bottom plate 76 slopes upwardly from its forward end 91, which is positioned, during operation, below the surface of the flooding water so that the paddles 84 through 89 will be able to scoop water, floating debris, and some sand onto plate 76 to lift it above the surface of the beach. The forward portion of the plate has a plurality of apertures 92 which preferably are closely spaced and of sufficient size to permit sand and water to pass through but which are smaller than the solid debris which is to be removed from the beach. The skimmer also includes a detention chamber 93 located beneath the portion of plate 76 which includes the apertures 90, this chamber being enclosed by a bottom wall 94 and a rear wall 96 extending between side walls 74 and 75, but having a forward opening 98.

The entire skimmer unit 70 is mounted on suitable support wheels 100 and 102 which may be secured to the skimmer unit by means of an axle 104 journaled in the side walls 74 and 75.

As the paddles are driven in a clockwise direction, as viewed in FIG. 2, by the conveyor belt 78, each paddle in turn moves around the forward roll 80 and picks up material from the flotation areas 66 and 68 on the beach 28, scooping a surface portion of that material into the skimmer channel. This material is carried upwardly along the inclined surface of bottom plate 76 and as it moves upwardly, water and heavy particulate matter such as sand flow down through the apertures 92, into chamber 93, and out the forward opening 98, thereby returning to the flotation area 66. It will be apparent that some of the floating material such as liquid oil or oil residues will also pass through the apertures 90, but this material will remain on the surface of the water trapped in chamber 93, and will collect at the upper left hand corner of that chamber. The collected floating material then serves as a filter for water and sand falling through the apertures 90 to insure that a sufficient degree of separation occurs. Once the chamber 93 is filled with oil above the water level, additional oil carried onto the bottom plate 76 cannot pass through apertures 92, and it, along with other floating debris, will be carried up the plate 76 and dumped into a collecting container 106 carried by the skimmer unit. This material may then be transported by way of a conventional lift conveyor 108 or other suitable means to a hopper 110, from which the material is conveyed by a bottom screw conveyor 112 to a dump truck or other vehicle for disposal. The conveyor 108 is mounted on the skimmer unit by suitable support arms 114 and 116 carried on a rear platform 118 of the skimmer. Hopper 110 preferably is secured to the skimmer by a towing hitch 120, the hopper being mounted on support wheels 122 and 124.

The material deposited in container 106 will be the floating debris and oil residues collected from beach 28. This material is substantially completely separated from the sand by the flotation action of the water and by the passage of the material along the bottom plate 76, so that the debris in container 108 includes only a small amount of sand and thus can be disposed of easily, with a minimal loss of sand from the beach. This apparatus for collecting material from the beach operates rapidly and inexpensively, uses a natural method of flooding and floating, results in much less loss of sand, and restores the beach to useable condition with less expense and disruption than with any other available apparatus.

Although the present invention has been disclosed in terms of a preferred embodiment, it will be apparent that numerous variations and modifications can be made without departing from the true spirit and scope thereof as set forth in the following claims.

I claim:

1. Apparatus for cleaning a beach to remove floatatable material such as oil residue and other debris, comprising:
   means for flooding a selected, localized area of the beach to be cleaned, whereby floatatable material is caused to rise to the surface of the beach; and
   skimmer/separator means for picking up said floatatable material from said selected, localized area and for separating said material from said flooding water.

2. The apparatus of claim 1, wherein said flooding means comprises conduit means for supplying water at high volume and low pressure to said selected area of beach.

3. The apparatus of claim 2, further including:
   a vehicle adapted for travel along a beach;
   means for mounting said conduit means on said vehicle, whereby motion of said vehicle advances said localized area of flooding along the beach.

4. The apparatus of claim 3, further including:
   means for moving said skimmer/separator along the beach, in synchronization with the motion of said localized area of flooding.

5. Apparatus for cleaning a beach by separating floatatable debris from the beach sand, comprising:
   flooding means for introducing a large volume of water under low pressure and low velocity to a relatively small, localized area and to cause floatatable debris to rise toward the surface of the sand;
   skimmer means for removing the top portion of material, including water and water-entrained sand together with any floating debris, from the localized area while said area is still flooded;
   separator means adapted to receive said top layer of material, to separate said floating debris from said material, and to return water and any entrained sand to said localized area, whereby said floatatable debris is separated from the sand in situ, without removal of the sand from the beach and without damage to beach ecology; and
   means for advancing said flooding means, skimmer means and separator means continuously along a beach to advance said localized area of flooding to continuously and progressively separate floatatable debris from the sand of the beach.

6. The apparatus of claim 5, wherein said flooding means includes conduit means for supplying water from a body of water adjacent the beach to be cleaned, and pump means for supplying water at a low velocity and high volume flow to produce a gently flowing pool of water in said localized area to simulate natural tidal or wave action to thereby cause a lifting and floating of buoyant materials in or on the beach with minimal disturbance of the natural beach formation.

7. The apparatus of claim 6, further including vehicle means adapted for travel along a beach; and
   means for mounting said conduit means on said vehicle.

8. The apparatus of claim 6, wherein said skimmer means includes paddle means for carrying said top portion of material into said separator means, and wherein said separator means includes an inclined perforated separator plate, said perforations permitting water and entrained sand to return to said localized area of the beach.

9. Apparatus for cleaning sand containing oil, oil residues, and other flotatable debris, comprising:

flooding means for introducing to a localized area of sand to be cleaned a continuous flow of water under low pressure and low velocity and in a quantity sufficient to flood the localized area and to produce a pool of water at the surface of the sand, the flood of water producing a lifting action on any bouyant materials in or on the sand within the localized area to cause oil, oil residues, and other floatatable debris to rise toward the surface of the sand and to float in the pool of water, said flooding means introducing said water at a velocity and pressure sufficiently low to minimize the entrainment of sand in said pool of water;

skimmer means adapted to remove material from the surface of said pool of water while said localized area is flooded, said removed material including floating oil, oil residues and other debris together with a small quantity of water and incidental water-entrained and debris-entrained sand;

separator means adapted to receive said removal material, to separate said floating oil, oil residues and other debris from the water and water-entrained said included in the material picked up by said skimmer means, and to return such water and water-entrained sand to said localized area; and means for advancing said flooding means, skimmer means and separator means along the sand to be cleaned to advance said localized area of flooding to progressively separate and remove floatatable oil, oil residues and other debris from the sand in situ, without removal of the sand and without environmental damage to the sand.

10. The apparatus of claim 9, wherein said flooding means includes conduit means and pump means for supplying water at low velocity and high volume, said conduit means including outlet means for directing said water toward said localized area to produce a gently flowing of water which will cause a lifting and floating of bouyant oil, oil residues and other floatatable debris with minimal disturbance of the natural condition of the sand.

11. The apparatus of claim 10, wherein said sand is a beach adjacent a body of water, and wherein said flowing pool of water simulates natural tidal or wave action on said beach.

12. The apparatus of claim 10, wherein said conduit means comprises a first large diameter pipe having an inlet and first and second spaced outlets, said outlets directing said flow of water generally toward the center of said localized area.

13. The apparatus of claim 12, wherein said conduit means further includes a second large diameter pipe having an inlet and first and second spaced outlets for directing said flow of water generally toward the center of said localized area.

* * * * *